US012361523B1

(12) United States Patent
Gupta et al.

(10) Patent No.: US 12,361,523 B1
(45) Date of Patent: Jul. 15, 2025

(54) IMAGE COMPARATOR WITH DIFFERENCE AREA LABELING

(71) Applicant: BrowserStack Limited, Dublin (IE)

(72) Inventors: Rishi Gupta, Indore (IN); Amit Singh Sansoya, Nawanshahr (IN); Neel Shah, Thane (IN); Ninad Sheth, Thane (IN); Akshay Minocha, Bengaluru (IN)

(73) Assignee: BrowserStack Limited, Dublin (IE)

( * ) Notice: Subject to any disclaimer, the term of this patent is extended or adjusted under 35 U.S.C. 154(b) by 0 days.

(21) Appl. No.: 19/022,883

(22) Filed: Jan. 15, 2025

(51) Int. Cl.
*G06T 5/50* (2006.01)

(52) U.S. Cl.
CPC ...... *G06T 5/50* (2013.01); *G06T 2207/20221* (2013.01); *G06T 2207/20224* (2013.01)

(58) Field of Classification Search
CPC ............. G06T 5/50; G06T 2207/20221; G06T 2207/20224
See application file for complete search history.

(56) References Cited

U.S. PATENT DOCUMENTS

| | | | | |
|---|---|---|---|---|
| 2008/0317357 A1* | 12/2008 | Steinberg | ................. | H04N 1/62 382/209 |
| 2008/0317378 A1* | 12/2008 | Steinberg | ................. | G06T 5/73 348/E5.081 |
| 2011/0135178 A1* | 6/2011 | Sato | ........................ | G06T 5/50 382/130 |
| 2013/0201403 A1* | 8/2013 | Iversen | ................. | H04N 13/39 348/659 |
| 2017/0076476 A1* | 3/2017 | Nakajo | .................. | H04N 1/387 |
| 2017/0278289 A1* | 9/2017 | Marino | ................... | G06T 7/536 |
| 2017/0316297 A1* | 11/2017 | Lee | ........................ | G06T 15/503 |
| 2018/0300863 A1* | 10/2018 | Zhang | ................. | G06F 16/9535 |
| 2020/0219237 A1* | 7/2020 | Ramsay | .................... | G06T 5/94 |
| 2020/0237041 A1* | 7/2020 | Sights | ...................... | D03D 1/00 |
| 2022/0156513 A1* | 5/2022 | Lee | ........................ | G06V 10/26 |
| 2023/0252612 A1* | 8/2023 | Ng | ............................. | G06T 5/80 |

OTHER PUBLICATIONS

Lewis, J. J., O'Callaghan, R. J., Nikolov, S. G., Bull, D. R., & Canagarajah, N. (2007). Pixel-and region-based image fusion with complex wavelets. Information fusion, 8(2), 119-130.*
Li, S., Kang, X., Fang, L., Hu, J., & Yin, H. (2017). Pixel-level image fusion: A survey of the state of the art. information Fusion, 33, 100-112.*
Choudhary, G., & Sethi, D. (2023). From conventional approach to machine learning and deep learning approach: an experimental and comprehensive review of image fusion techniques. Archives of Computational Methods in Engineering, 30(2), 1267-1304. as.*

* cited by examiner

*Primary Examiner* — Sarah Lhymn
(74) *Attorney, Agent, or Firm* — Cognition IP, P.C.; Edward Steakley; Saleh Kaihani

(57) ABSTRACT

An image difference generator can receive first and second images of first and second display outputs of a computer program, such as a webpage. The images can contain two different categories of differences, one related to the differences in the webpage code, and one related to the differences unrelated to the webpage code, such as differences due to environmental, platform, or generally indeterministic sources, unrelated to the webpage code. The image difference generator can identify each category of the differences and their corresponding regions in each image, and highlight them differently in an output difference image. A developer of the software or webpage can inspect the output difference image and focus her development activity on the appropriate category.

20 Claims, 10 Drawing Sheets

IMAGE COMPARATOR WITH DIFFERENCE AREA LABELING

BACKGROUND

Field

This invention relates generally to software development tools, and more particularly to tools directed to visual testing of the output of a software.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Image difference generators can be a powerful tool for software development. They can be used to quickly and efficiently inspect and compare two display outputs of a computer program, as a software developer writes codes and scripts. Image difference generators can be used to highlight the differences in the display output of a computer program, for example, to compare two different versions of a display output of a computer program. Some image difference generators do not include features to identify changes in the display output that are due to environmental or platform changes, as opposed to differences due to code changes in the computer program. A robust image difference generator can highlight code-related differences to help a developer better focus their software development activities.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1:
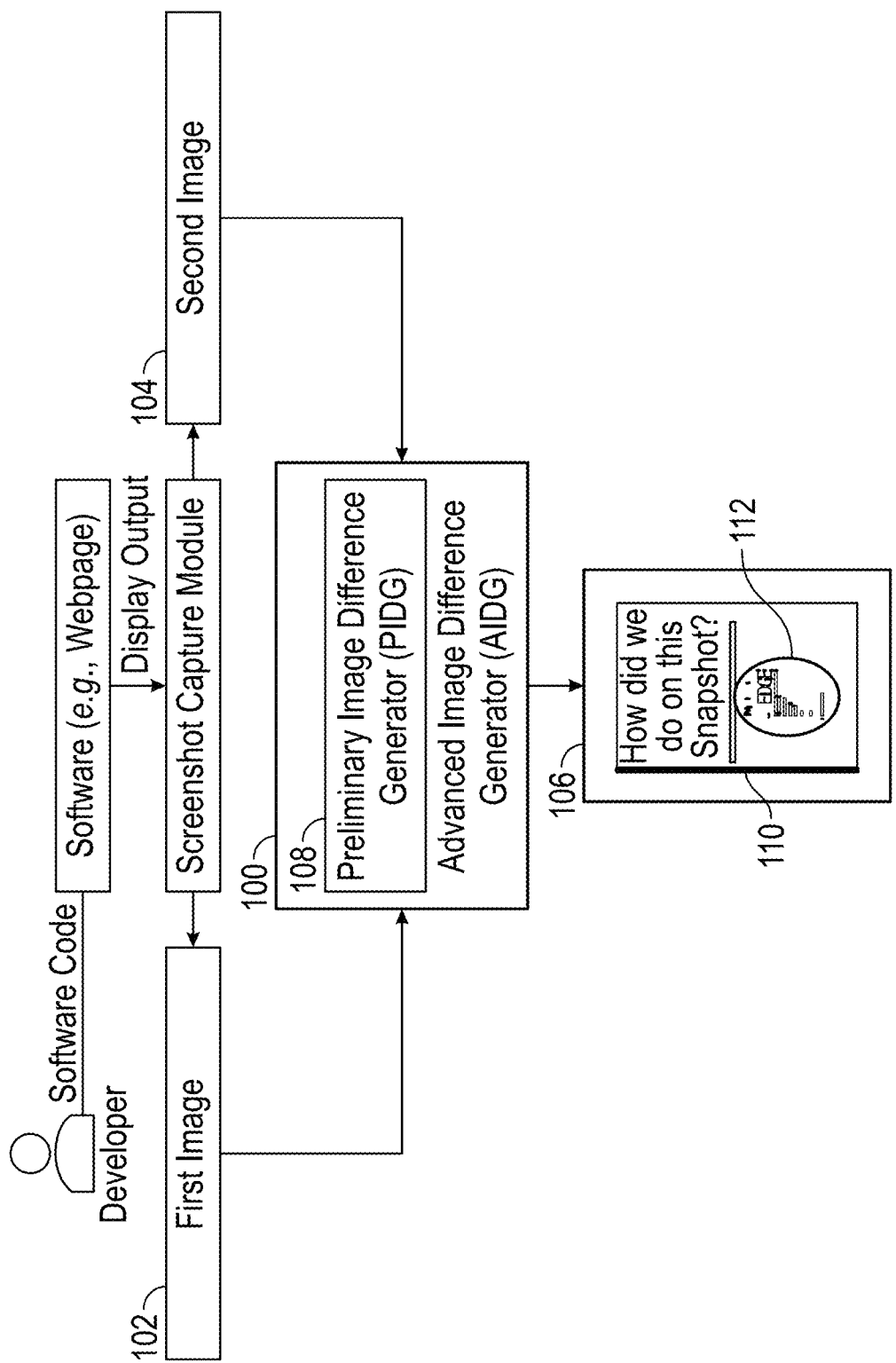
FIG. 1 illustrates the input/output of an advanced image difference generator (AIDG), and an example environment of the operation of the AIDG, according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Software development tools (SDTs) can allow a developer to write software code, and test the code using the same user interface. In this manner, the developer can quickly observe the output of the software, in relation to a recent change in the code. In some respects, the tools can provide both functional testing and visual testing. Functional testing can refer to examining the correct responsiveness of the software for tasks and workflows that relate to the behavior of the software and the outcome or output of the software, which may or may not accompany a visual output. Example of functional testing can include testing the functionality of a shopping cart feature of a website, ability of a script to perform its intended function, and testing the ability of an email generator to compose and send automated emails. Developers also utilize visual testing tools to examine the display output of a software. For example, website developers write and change the code of a website and test the website. In addition to functional testing, website developers are also interested in performing visual testing. Visual testing can include observing the output of the software to test whether the desired changes have been rendered. Visual testing can also include observing the output of the software to test whether undesirable changes are introduced after a recent change in the code of the software. For example, a developer may change the shopping cart code of a website. The developer may be interested in performing visual testing of the relevant webpages before and after the code change, to test whether any undesirable visual and display changes may have been introduced, after the change in the code.

Image difference generators (IDGs) can take before and after images of the display output of a software (e.g., webpages of a website) and flag or otherwise highlight the differences between two versions of the display output. As software display outputs (e.g., webpages) can include numerous elements, IDGs can help developers quickly identify and visually inspect the areas of difference to determine whether they are desirable or undesirable changes, and particularly whether an observable difference is due to a change or revision in the code, or due to factors unrelated to a revision a software developer may have implemented in the code. IDGs can be helpful tools, but their usefulness is sometimes diminished if they flag or highlight minor differences, that are sometimes undetectable by a human eye and therefore inconsequential in terms of software development.

In the area of website and webpage development, a browser's rendering of a webpage can have minor differences, that can in some cases also be unrelated to any changes in the webpage code. These minor differences can include some areas of the webpage shifting by one or two pixels, slight font differences, slight color intensity, and other similar changes that are often difficult if not impossible to perceive with the naked human eye but can nevertheless be highlighted by IDGs as differences in the image. Such false positive highlighting of minor differences can distract the developer and reduce his coding efficiency. More robust IDGs can be integrated into SDTs, or applied independently to highlight more substantive differences, with less false positives.

Minor image differences be due to various factors, unrelated to the webpage code. For example, minor differences can arise due to approximations made by browsers, pixel rounding by the browsers, where fractional pixels get rounded differently, shifting webpage element positions slightly, sub-pixel rendering, where anti-aliasing and sub-pixel adjustments can vary, altering text or line thickness, graphics processing unit (GPU) rendering webpage graphics differently, where different graphics settings can make colors or positions appear slightly different. Some other hardware/software factors that can contribute to minor visual changes can include, memory changes, where high memory use can delay rendering, causing webpage elements to move slightly. Screen settings can change the layout of a webpage, making elements shift or resize a bit. In general, such minor visual differences can indeterministically appear between the same version of the display outputs of a program. These minor visual shifts are in many cases not visible by the naked eyes but can be highlighted by an IDG. A robust IDG can identify minor visual differences as false positives and not highlight them, or highlight them differently, than the more substantive visual differences. At the same time, a robust IDG still flags changes due to code change and changes that are perceptible by a human eye.

Some minor differences in display output of a software program for the same content (e.g., a webpage) can be due to inconsistent browser rendering. Different browsers may render the same hypertext markup language (HTML) and cascading style sheets (CSS) differently, leading to visual discrepancies across platforms. Fluctuating content delivery network (CDN) Performance can also cause minor shifts in the visual output of a computer program. Variability in content delivery network (CDN) speeds can cause delays or changes in loading assets, impacting visual consistency. For example, a CDN can serve different multipurpose Internet mail extensions (MIME) type data for the same requested content, leading to visual differences. Minor content shifts can also cause a minor shift in the visual output of a computer program for the same content. For example, small adjustments in content done by a browser as part of an approximation in margins, padding, etc. can lead to minor shifts in content, leading to visual differences.

While direct image comparison for visual output testing can be performed, it can be insufficient for practical scenarios, for example, due to outlining of minor shifts, which can reduce the usefulness of the visual comparison. Nevertheless, IDGs can be made more robust if they can analyze dynamic object model (DOM) elements of a software page (e.g., a webpage), and render a difference image with minor changes not highlighted, or highlighted differently. The document object model (DOM) connects webpages to scripts or programming languages by representing the structure of a document, such as the HTML representing a webpage, in memory. In some cases, DOM can be in JavaScript, even though DOM may model HTML, scalable vector graphics (SVG), or extensible markup language (XML) documents as objects, which are typically not part of the core JavaScript language. The DOM represents a document, such as a webpage, with a logical tree. In some scenarios, visual differences due to changes in the DOM can be more important to a developer than changes that are due to other factors, such as browser rendering or hardware-related differences. DOM changes are more likely to be due to changes in code, as opposed to environmental or platform differences.

FIG. 1 illustrates the input/output of an advanced image difference generator (AIDG) 100, and an example environment of the operation of the AIDG 100, according to an embodiment. The AIDG 100 receives first and second images 102, 104 and generates an output difference image 106. In practice, the first and second images can be different display outputs of a same program (e.g., a webpage), where a developer is interested in quickly and visually inspecting the differences between the two display outputs. For example, the display outputs can be obtained before and after the developer makes a revision in the software code. A screenshot capture module can grab screenshots of the display output of the software (e.g., the webpage). The AIDG 100 can highlight the areas different between the first and second images. The AIDG 100 can highlight substantial difference areas (SDAs) 110 in one color (e.g., red), and minor difference areas (MDAs) 112 in another color (e.g., amber). As the name suggests, the substantial difference areas, SDAs 110, can be those differences that are readily discernible by a human viewer of the display output, while the minor difference areas, MDAs, 112 may not be discernible by a human viewer of the display output. For example, MDAs 112 can be due to an image in both first and second image 102, 104, having loaded at different speeds between the two images, or a textbox rendering at slightly different locations in the second image 104, relative to the first image 102.

In some cases, the MDAs 112 are likely due to environmental, or platform-related differences or other indeterministic reasons, while the SDAs can more likely relate to the software code, or a change introduced by the developer. The AIDG 100 can utilize a preliminary image difference generator (PIDG) 108. The PIDG 108 can generate a preliminary difference image between the first and second images 102, 104. The embodiments described herein can be used to identify and visually distinguish SDAs 110 and MDAs 112 in the preliminary difference image and generate the output difference image 106.

Figure 2:
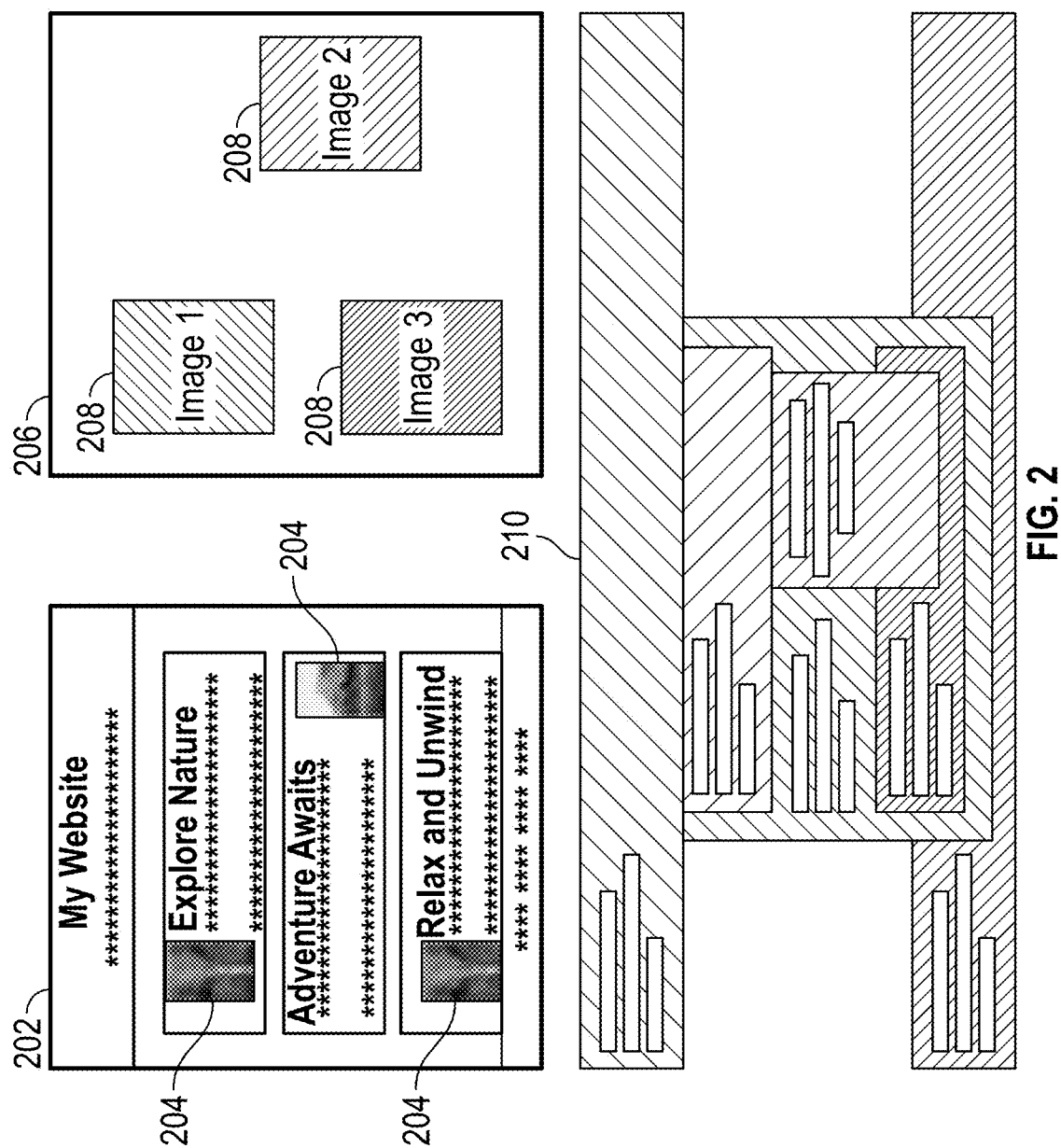
FIG. 2 illustrates example diagrams of context images.

The AIDG 100 can generate a context image from an input image. The context image can be used in the operations of the AIDG 100, for example, in identifying common areas between two images, from the context images of each image. If the software is a webpage, a context image is a layout image generated from the DOM elements of the webpage, with different elements, identified, localized, and labeled. A context image can be visually represented as well; although, not necessarily to the developer in all embodiments. In other words, the context images can be generated by the AIDG 100, and internally used therein, during intermediary operations of the AIDG 100. FIG. 2 illustrates example diagrams of context images. For example, a webpage 202 can include images 204 at various locations and text at various locations. Two screenshots of webpage 202 can be the first and second images 102, 104. The AIDG 100, as part of its operations, can generate the context image 206. The context image 206 includes an identification of the images 204, including their location, for example coordinates, in the webpage 202. The context image 206 includes layout images 208, corresponding to each image 204 in the webpage 202. The context image 206 can include the type of element and its location, for example coordinates. In the context image 206, the images 204 are labeled as images 208. The images 204 are not replicated in the context image 206; instead, they are labeled in locations corresponding to the locations of the images 204, in order to generate a layout of the webpage 202. FIG. 2 also illustrates another context image, context image 210, for a more complex webpage. The source webpage of the context image 210 is not shown; however, the context image 210 illustrates multiple layered elements overlapping one another, which can usually be encountered in modern complex webpages.

Generating a context image includes capturing DOM elements of a webpage, for example, via capturing DOM metadata. In some embodiments, DOM elements can be captured, using JavaScript to store DOM elements types, properties, and their hierarchy in a JavaScript object notation (JSON) format file. The DOM metadata can include information on how webpage elements are stacked, their order and their coordinates. When the AIDG 100 is used with a webpage, the AIDG 100 generates a DOM context image, by capturing and examining the DOM metadata. Furthermore, the context image (and the underlying DOM metadata) can be used to generate a DOM mapping of visual elements of a webpage to the DOM elements of the webpage. In this manner, any visual differences, identified by the operations of the AIDG 100, can be mapped to the DOM element, and by extension, the webpage element, that correspond to those visual differences. The DOM mapping can be used to determine which visual differences between the first and second images are due to changes in DOM and the extent of contribution of a DOM change to an identified visual difference between a first and second image 102, 104. In some embodiments, the AIDG 100 can determine if an identified image difference has a corresponding DOM element, which can indicate the image difference is of the substantial kind, or it does not have a corresponding DOM change, which can indicate the difference may be minor.

Figure 3:
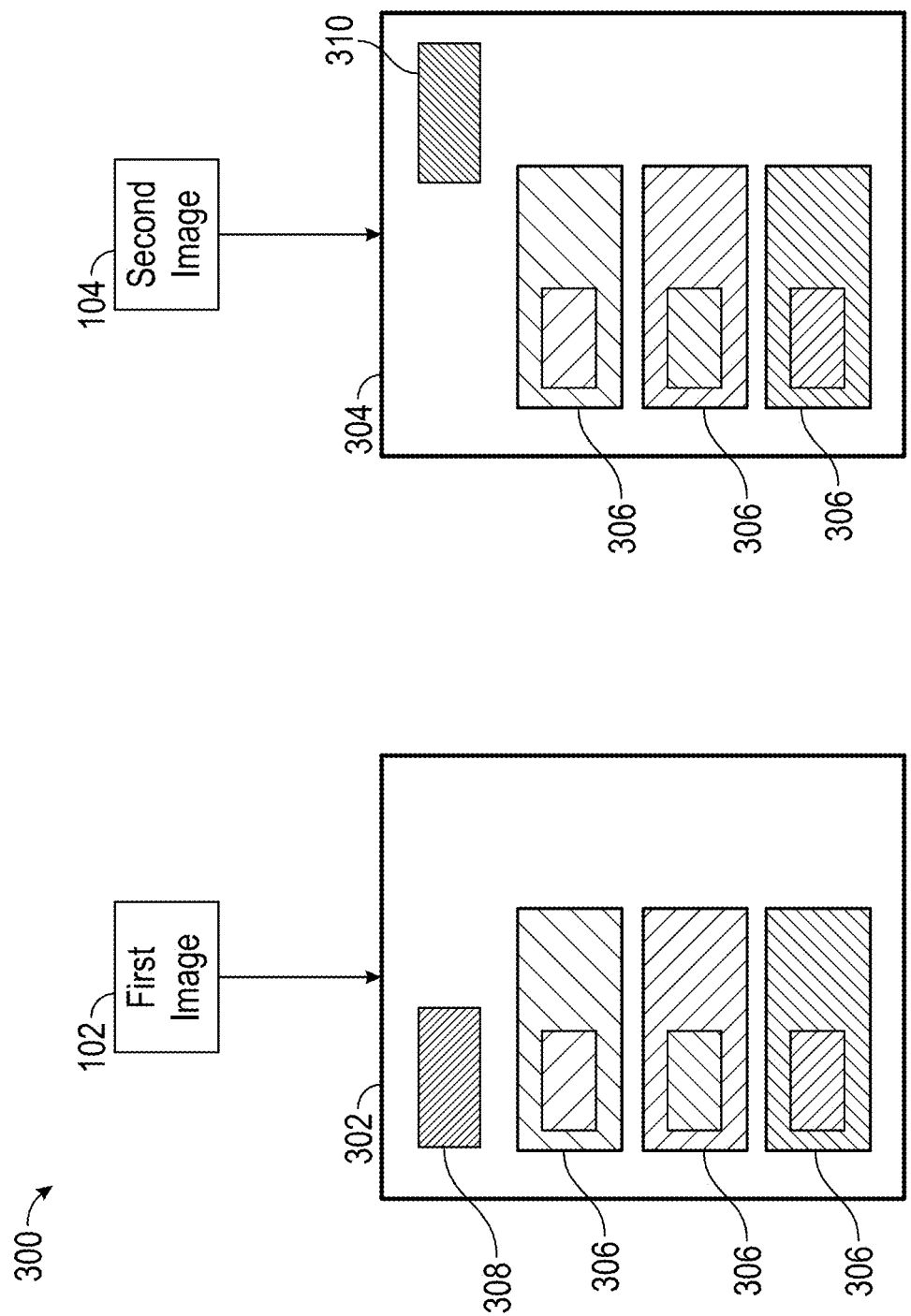
FIG. 3 illustrates example diagrams of context images and source images.

FIG. 3 illustrates example diagrams 300 of context images and source images. The AIDG 100 receives the first and second images 102, 104 and generates the first and second context images 302, 304, respectively. In some embodiments, the AIDG 100 receives or captures DOM metadata, associated with first and second images 102, 104, and generates the first and second context images 102, 104, respectively, based on the DOM metadata. The first and second images 102, 104 can be images of a display output of a computer program, such as a webpage, obtained at different times. Consequently, the first and second images 102, 104 can share many common areas, but there can be substantial and/or minor differences between the first and second images 102, 104, in addition to the common areas. The first and second context images 302, 304, can also include shared areas, areas of substantial and/or minor differences, corresponding to and depending on the existence of those areas in the first and second images 102, 104. In the example shown, the common areas 306 are shared between the first and second context images 302, 304, while the area 308 exists only in the first context image 302, but not in the second context image 304, at least not in the same location. The area 310 exists in the second context image 304, but not in the first context image 302, at least not in the same location. Furthermore, the areas 308, 310 are include a relatively substantial number of pixels. In other words, the areas 308, 310 are areas of substantial difference between the first and second context images 302, 304, and by extension the first and second images 102, 104. The difference areas 308, 310 can be the same content (e.g., the same image element), but in a different location in each of the first and second context images 302, 304, or they can be different content at different locations between the first and second context images 302, 304.

Figure 4:
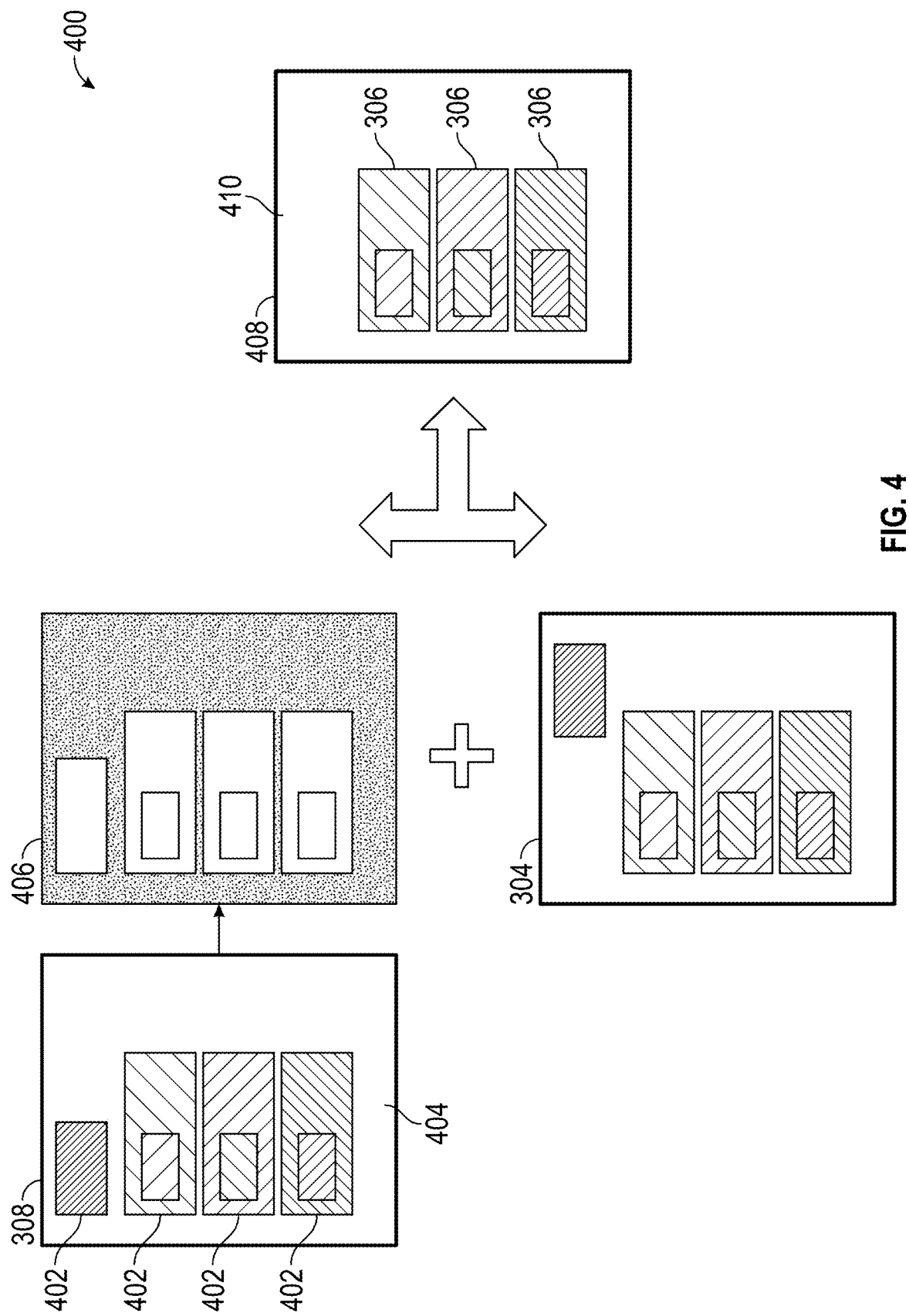
FIG. 4 illustrates example diagrams of context images, masking and inversion to identify common areas between two context images.

FIG. 4 illustrates example diagrams 400 of context images, masking and inversion to identify common areas 306 between two context images. The AIDG 100, as part of its operations, can identify the common areas 306, in the first and second context images, as shown in FIG. 3. Each context image can include element areas and transparent areas. Element areas 402 are areas that correspond to a content element in an image, for example, an image within a larger image, a video clip (or a series of animated images), text blocks, etc. The transparent areas 404 are those areas of the image, or context image, that are blank and do not include any elements. For example, for a webpage, the element areas can be images, images within images, video clips (e.g., an animated series of image frames). The transparent areas 404 can be a webpage-type white or clear background. Stated otherwise, for webpages, the element areas 402 correspond to areas for which, there is one or more corresponding DOM elements, while transparent areas 404 correspond to areas for which there is no corresponding DOM element. The AIDG 100 can identify the element and transparent areas 402, 404, and their respective locations (e.g., coordinates, or other location identifier, such as those determined via drawing a bounding box around an area) in the first context image 302.

The AIDG 100 can selectively apply an inversion mask to the first context image.

Selectively applying the inversion mask, for the purpose of determining common areas 306, includes selecting the element areas 402 and inverting them, and selecting transparent areas 404 and inverting them. While the element areas 402 can include various layers, (e.g., labeled with different colors), the AIDG 100 can treat all element areas as black, for the purpose of applying an inversion mask to determine common areas. Selectively applying the inversion mask can include converting all transparent areas to black and all color or black areas to white pixels. In the example shown, selectively applying the inversion mask, as described above, can yield the inverted first context image 406.

Combining operations will be performed between the inverted context image 406 and the second context image 304, yielding a combined context image 408. The combined context image includes the common areas 306 and the combined context image transparent areas 410. In effect, the operations diagramed in FIG. 4 identifies the common areas 306 and highlights them in the combined context image 408. The combined context image 408 can be used in other operations of the AIDG 100. The combining operations can be selectively defined. For example, in the example shown, the combining operations combining the inverted first context image 406 and the second context image 304 can include the following rules. A black pixel in the inverted first context image 406, combined with any pixel in the second context image 304, yields a white pixel in the combined context image 408. A white pixel in the inverted first context image 406, combined with any pixel in the second context image 304, yields in the combined context image 408, the same pixel. In other words, the black pixels in the combining operations, act as zeros in an "AND" operation, with the result of the combining operations, inverted into transparent or white pixels in the combined context image 408. The white pixels in the combining operations, act as ones in an "AND" operation.

Figure 5:
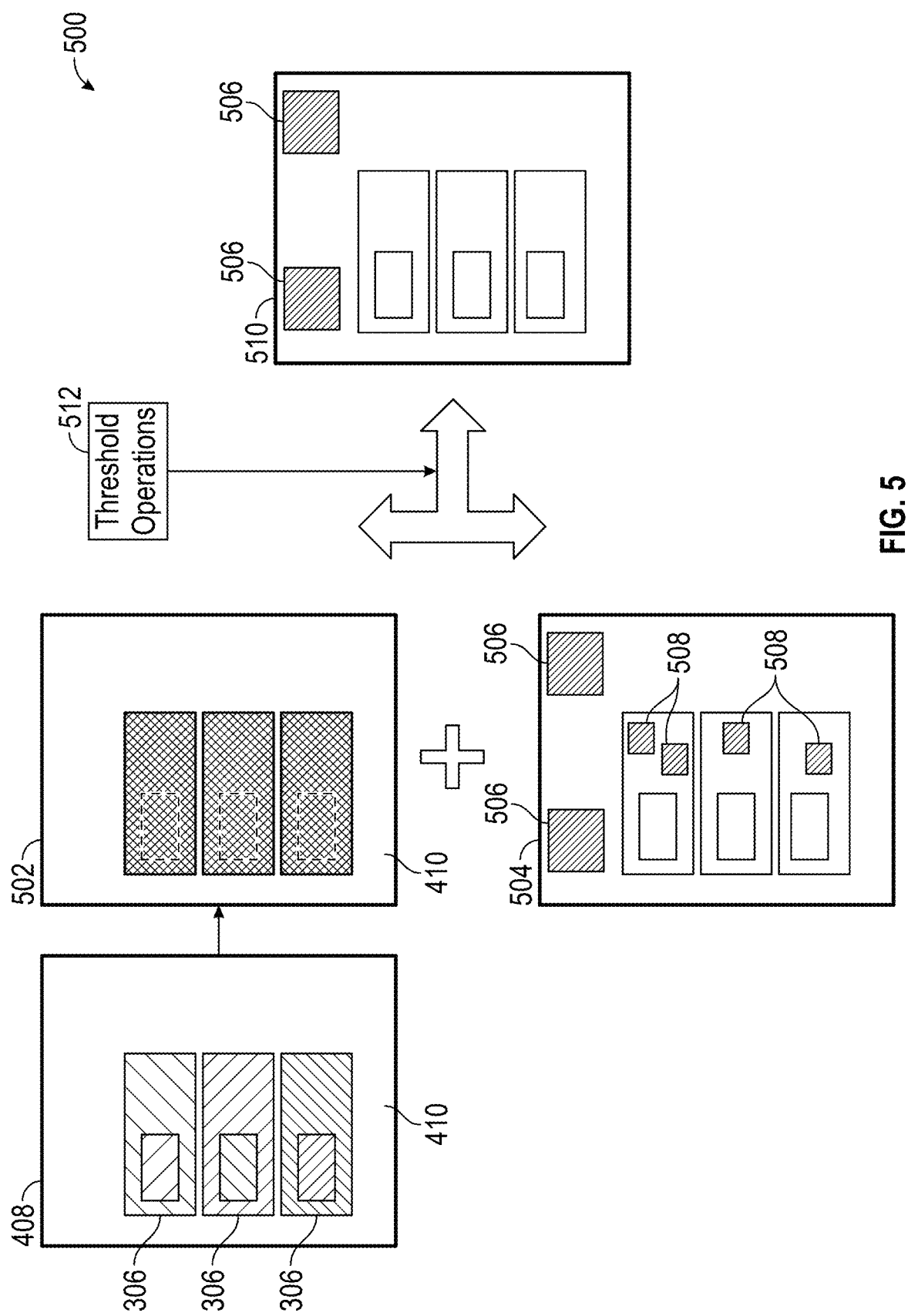
FIG. 5 illustrates example diagrams, used to identify differences in the transparent areas, or areas that do not correspond to any dynamic object model (DOM) elements.

FIG. 5 illustrates example diagrams 500, used to identify differences in the transparent areas, or areas that do not correspond to any DOM elements. The AIDG 100 can generate an inverted combined context image 502, by selectively applying an inversion mask. The inversion mask, in this instance, inverts the common areas 306 in the combined context image 408, while leaving the combined context image transparent areas 410, untouched. In other words, the common areas 306 are inverted to black pixels and the combined context image transparent areas 410 are left as transparent.

The preliminary image difference generator (PIDG) 108 can generate a preliminary difference image (PDI) 504. The PDI 504 can be generated, based on the first and second images 102, 104, or based on context images 302, 304. The PDI 504 can be generated, based on a pixel-by-pixel combining of the input images of the PIDG 108, via for example, an "AND" operation. In this manner, the PDI 504 includes differences substantial or minor in all areas of the input images. In the example shown, the differences 506 occur in the transparent areas, while the differences 508 occur in the common areas.

Merger operations will be performed merging the inverted combined context image 502 and the preliminary difference image (PDI) 504, generating an intermediary difference image 510. The intermediary difference image 510 includes differences 506, occurring in the transparent areas, that are not corresponding to any DOM elements. The rules of the merger operations in this instance, to produce the intermediary difference image 510, can include the following. A black pixel from the inverted combined context image 502 merged with any pixel in the common areas in the preliminary difference image 504, yields a white pixel in the common areas in the intermediary difference image 510. A white pixel in the transparent areas of the inverted combined context image 502 merged with any pixel in the transparent area of the preliminary difference image 504, yields the value of that same pixel in the transparent area of the intermediary difference image 510. In other words, the black pixels in the common areas act as zeros in an "AND" operation, with the result of the merging operations, inverted in the common areas, thus eliminating any differences 508, occurring in the common areas, in the resulting intermediary difference image 510. The white pixels in the transparent areas act as ones in an "AND" operation, thus maintaining the difference areas 506, in the transparent areas of the intermediary difference image 510. The intermediary difference image 510 is a difference image that contains the difference areas 506 that are more likely due to the code changes between the first and second images, as opposed to minor platform, or environmental differences between when the first and second images were generated. As a result, the intermediary difference image 510 includes the differences that are substantial, in the sense that they are of interest to the developer because those differences are more likely due to a difference in code. As a result, the intermediary difference image 510 can alternatively be referred to as the "substantial intermediary difference image" and the difference areas 506 likely correspond to and can be the basis of the SDAs 110 in the output difference image 106 and can be highlighted as such in that output.

Threshold operations 512 can override elimination of the difference areas 508 in the merger operations, depending on the size and amount of contribution of those areas to the PDI 504. In other words, difference areas 508, which contribute substantially (e.g., in an amount greater than a selected threshold) can still be retained in the intermediary difference image 510 in the common areas, despite the result of the merger operations. In the example shown, no difference areas 508 contributes beyond the selected threshold; and therefore, no difference areas 508 are retained in the intermediary difference image 510. However, other images might produce difference results, where some difference areas 508 are maintained, overriding the merger operations with respect to the maintained areas.

Furthermore, the selected threshold to maintain some difference areas 508 can be adjustable. The difference areas 508 occurring in the common areas are likely candidates for minor changes that can be eliminated or flagged as trivial to the developer. In some embodiments, the selected threshold can correspond to an "ignore percentage" parameter. A higher "ignore percentage," can adjust the selected threshold in a manner that difference areas 508, would not have to make as substantial of a contribution to the PDI 504, or a corresponding common area, before they are eliminated from the intermediary difference image 510. A lesser "ignore percentage," can adjust the selected threshold in a manner that difference areas 508 would have to make more of a substantial contribution to the PDI 504, or a corresponding common area, to be eliminated from the intermediary difference image 510. In some embodiments, the selected threshold directly corresponds to a "contribution to amount of differences" in the PDI 504, or a corresponding common area or element, where a difference 508 is located. In this scenario, the selected threshold, or the contribution-to-differences threshold is inversely proportional to the "ignore percentage" parameter.

Figure 6:
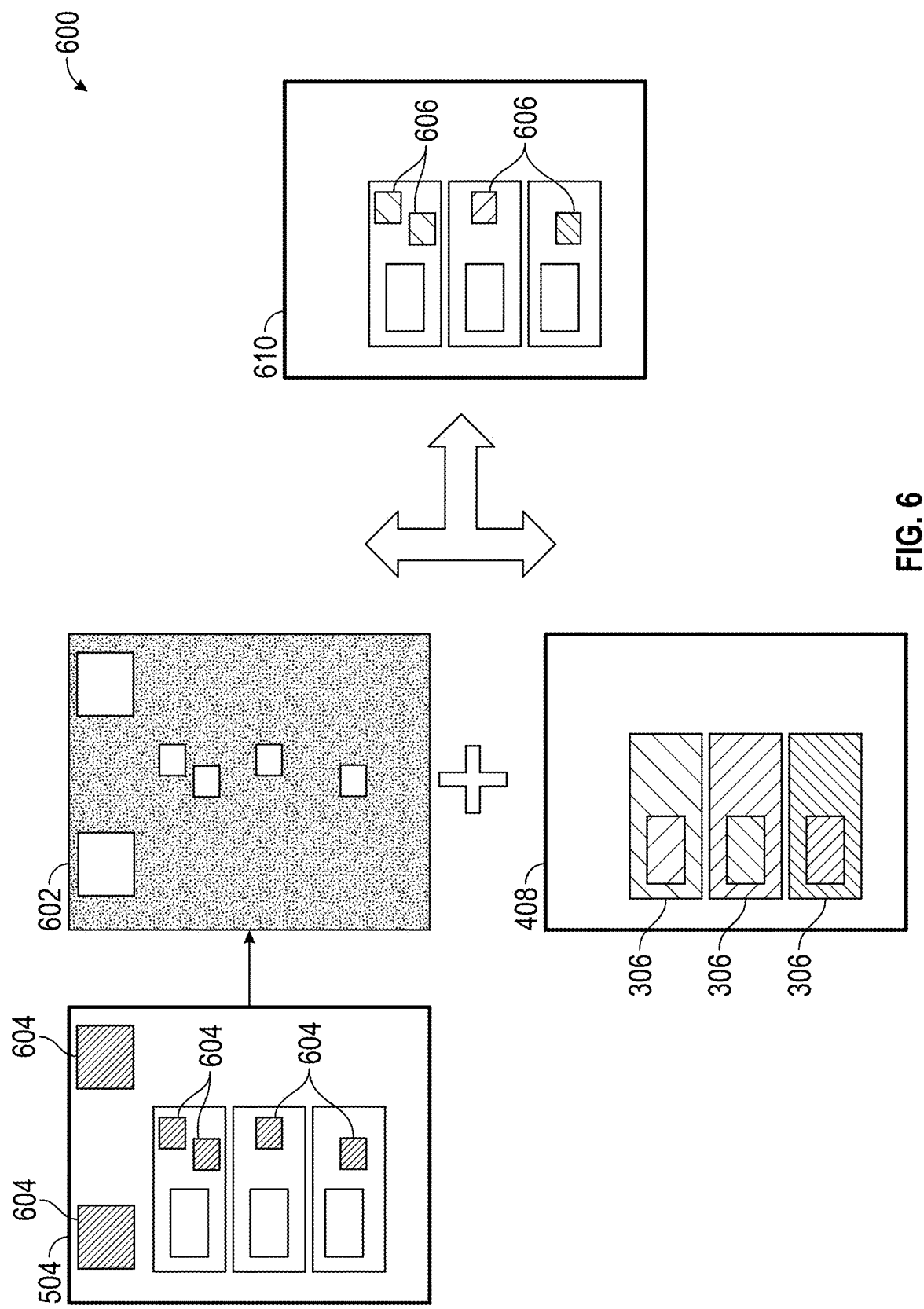
FIG. 6 illustrates example diagrams, used to identify minor difference areas.

FIG. 6 illustrates example diagrams 600, used to identify minor difference areas. The minor difference areas can more likely be due to platform, environmental or other reasons, unrelated to the code of first and second images. The minor differences can be ignored in the output difference image 106, or can be highlighted differently than more substantial changes or differences. The AIDG 100 can generate an inverted PDI 602, by inverting the pixels of the PDI 504. In other words, the AIDG 100 can generate a PDI 504 or receive it from the output of the PIDG 108, and generate an inverted PDI 602, by turning every white pixel into black and every color pixel into white pixel. The PDI 504 includes two areas. The white areas, which indicate areas that the PIDG 108 did not detect a difference between the two images, and the colored areas 604, which indicate the areas where the PIDG 108 did detect a difference. In other words, the colored areas 604 can alternatively be referred to as difference pixels 604. In this scenario, when generating the PDI 504, the PIDG 108 does not distinguish between the common areas, transparent areas and major or minor differences. Instead, it labels every pixel in the same location between the first and second images 102, 104, that is of different pixel value between the two images. In other words, in some embodiments, the PIDG 108 operations can be a pixel-by-pixel comparison. Other implementations of the PIDG 108 are also possible.

The inverted PDI 602 can be added to the combined context image 408, yielding a second intermediary difference image 610. The combined context image 408 includes the common areas 306. The addition operation, in this instance, maintains only the differences 606 in the common areas in the second intermediary difference image 610. The addition operation rules, in this instance, includes the following. Any black pixel added to any pixel results in a white pixel in the second intermediary difference image 610, and any white pixels added to another pixel, retains the value of that pixel in the second intermediary difference image 610. In other words, the black pixels act as zeros in an "AND" operation with the results inverted, generating a white pixel in the second intermediary difference image 610, whenever any pixel is added to a black pixel. The white pixels act as ones in an "AND" operation, not changing the value of any pixel added, when generating the second intermediary difference image 610. The differences 606 are more likely to be minor differences, that are of no interest or less interest to the developer. The differences 606 can be ignored, or highlighted differently in the output difference image 106. In other words, the difference areas 606 likely correspond to and can be the basis of the MDAs 112, when generating the output difference image 106.

In some embodiments, the AIDG 100 can generate the output difference image 106 to ignore and not highlight the MDAs 112. In other embodiments, it can beneficial to nevertheless, show or highlight the MDAs 112 in a different color, relative to SDAs 110 to indicate to the developers that the MDAs 112 are areas of differences, but likely they are minor and not related to the software code, while the SDAs 110 are detected to be areas of potentially more relevant changes and differences due to the software code. The example output difference image 106 includes both SDAs 110 and MDAs 112, highlighted differently.

Figure 7:
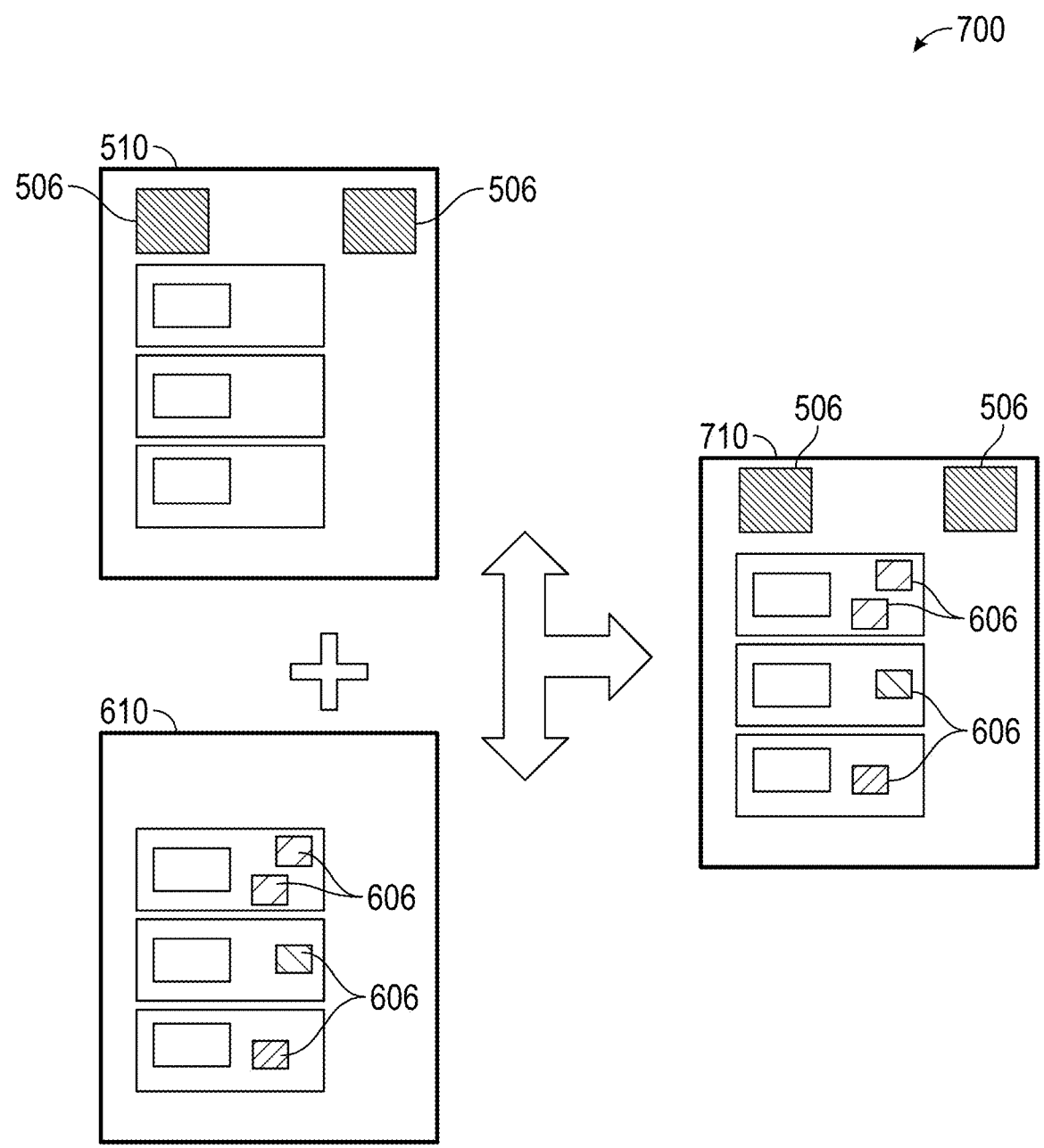
FIG. 7 illustrates example diagrams of generating a combined difference image, which can be used to generate an output difference image, showing both substantial difference areas (SDAs) and minor difference areas (MDAs), highlighted differently.

FIG. 7 illustrates example diagrams 700 of generating a combined difference image, which can be used to generate the output difference image 106, showing both SDAs 110 and MDAs 112, highlighted differently. To generate the output difference image 106, in this manner, the first intermediary difference image 510, containing substantial difference areas 506 can be added to the second intermediary difference image 610, containing the minor difference areas 606 to generate a combined difference image 710. The substantial difference areas 506 correspond to SDAs 110. The minor difference areas 606 correspond to MDAs 112. The combined difference image 710 can be used to generate the output difference image 106, which contains both SDAs 110 and MDAs 112.

In some embodiments, the AIDG 100 can also map every difference pixel 604 to a corresponding DOM element if such a DOM element exists. In this manner, the visual differences in the output difference image 106 can be mapped to a corresponding DOM element (if such an element for a visual difference exists). In this manner, the developer can visit and troubleshoot the DOM element or software element corresponding to the visual difference, for the purpose of inspection, debugging or revision.

Figure 8:
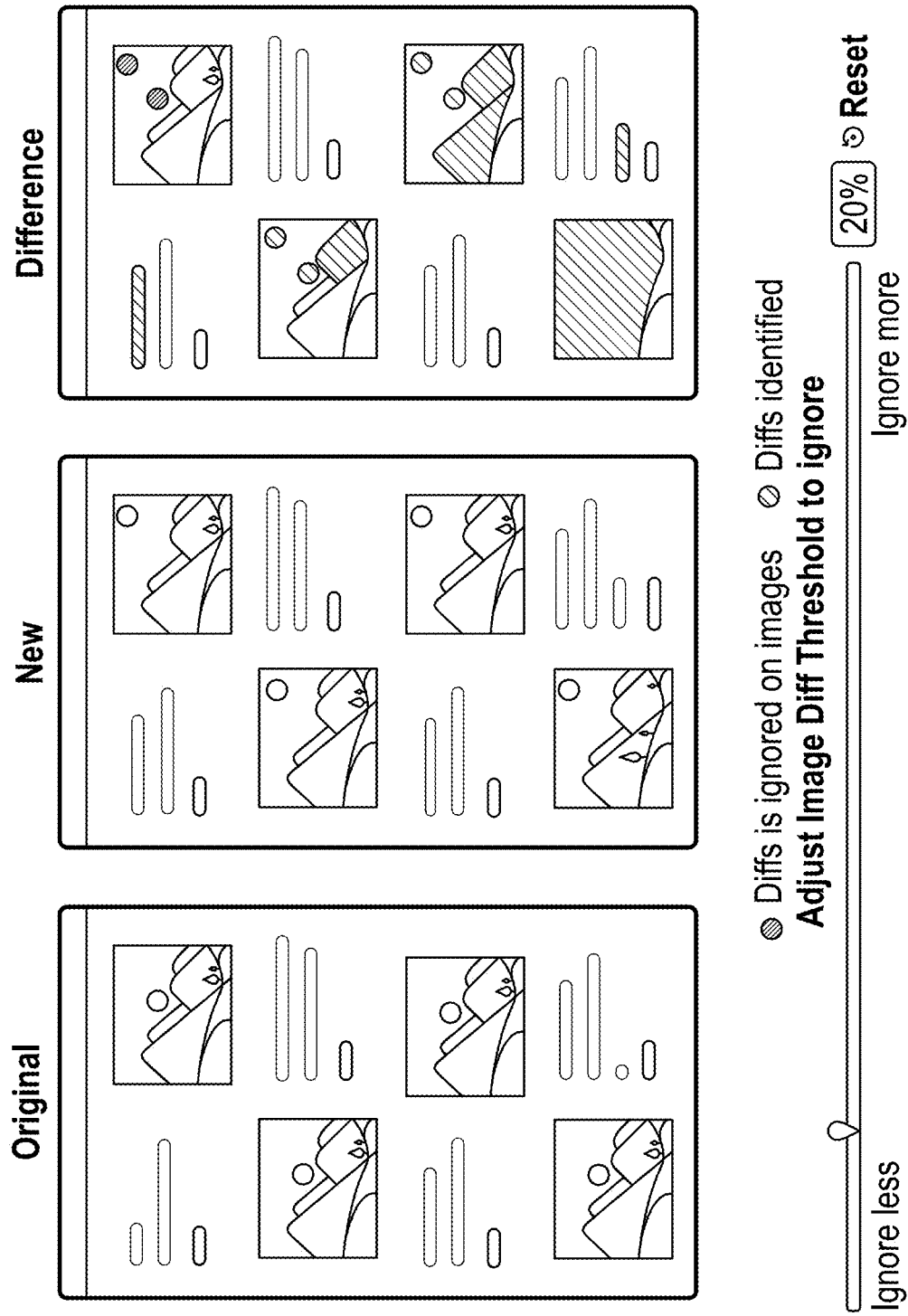
FIG. 8 illustrates an example diagram of an implementation of a user interface element for receiving an "ignore percentage" parameter.

FIG. 8 illustrates an example diagram of an implementation of a user interface element for receiving the "ignore percentage" parameter, as described above. In this implementation, the developer can use as slider user interface element to increase or decrease the "ignore percentage" parameter. The AIDG 100 shows an original picture, corresponding to the first image 102, a new picture, corresponding to the second image 104, and a difference image, corresponding to the output difference image 106. Manipulating the slider can cause the AIDG 100 to ignore more or less, as the case may be, when determining MDAs and flagging them.

Figure 9:
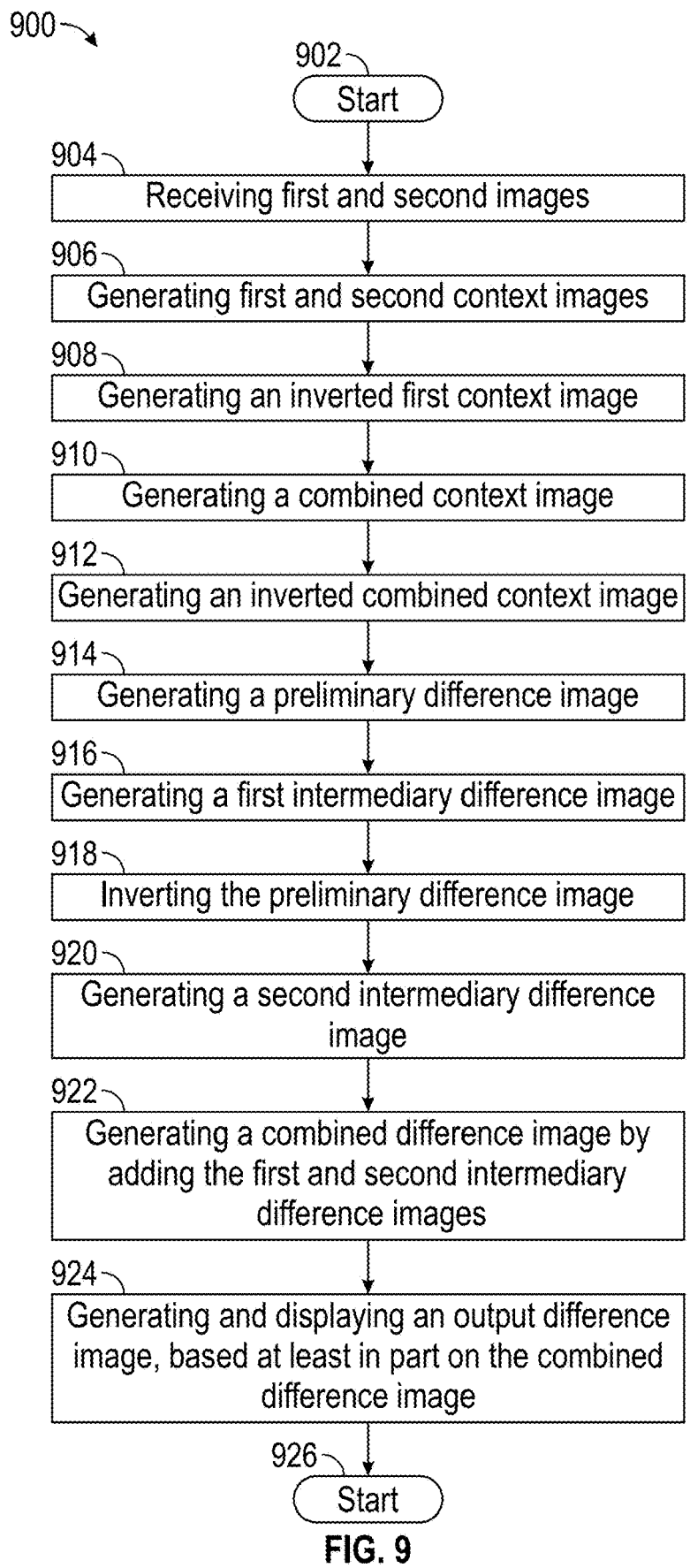
FIG. 9 illustrates a flowchart of an example method of generating an output difference image with SDAs and MDAs, identified and differently highlighted.

FIG. 9 illustrates a flowchart of an example method 900 of generating the output difference image 106 with SDAs 110 and MDAs 112 identified and differently highlighted. The method starts at step 902. Step 904 includes receiving first and second images. If the first and second images are webpages, the DOM metadata can also be received. Step 906 includes generating a first and second context images. Step 908 includes generating an inverted first context image from the first context image, as described in relation to the embodiment of FIG. 4. Step 910 includes generating a combined context image by combining the inverted first context image and the second context image, as described in relation to the embodiment of FIG. 4. Steps 908, 910 yield the combined context image 408. The combined context image 408 identifies and labels the common areas 306.

Step 912 includes inverting the combined context image 408, and generating an inverted combined context image 502, as described in relation to the embodiment of FIG. 5. Step 914 includes generating a preliminary difference image PDI 504 from the first and second images. Step 916 includes generating a first intermediary difference image 510 by merging the inverted combined context image 502 and the PDI 504, as described in relation to the embodiment of FIG. 5. The first intermediary difference image 510 includes the substantial difference areas 506, which correspond to SDAs 110. In other words, steps 912, 914, 916 culminate in generating a first intermediary difference image, which includes the difference areas 506 that are the basis of or correspond to the SDAs 110. Furthermore, threshold operations 512, described in relation to the embodiment of FIG. 5 can maintain substantial difference areas, even if they happen to occur in common areas of the two context images.

Step 918 includes inverting the preliminary difference image, as described in relation to the embodiment of FIG. 6.

Step 920 includes adding the inverted preliminary difference image to the combined context image 408, generating a second intermediary difference image 610. The second intermediary difference image 610 includes difference areas 606 that are the basis of or correspond to the MDAs 112. Step 922 includes generating a combined difference image 710 by adding the first and second intermediary difference images 510 and 610, as described in relation to the embodiment of FIG. 7. The combined difference image 710 includes both difference areas 506, 606, which are the basis of or correspond to the SDAs 110 and the MDAs 112, respectively. Step 924 includes generating a user interface output, based on the combined difference image 710. For example, step 924 can include generating and displaying an output difference image 106, based, at least in part, on the combined difference image 710, where the output difference image 106 highlights the SDAs 110 and the MDAs 112 in different colors, using the pixel-labeling data from the combined difference image 710. The method ends at step 926.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
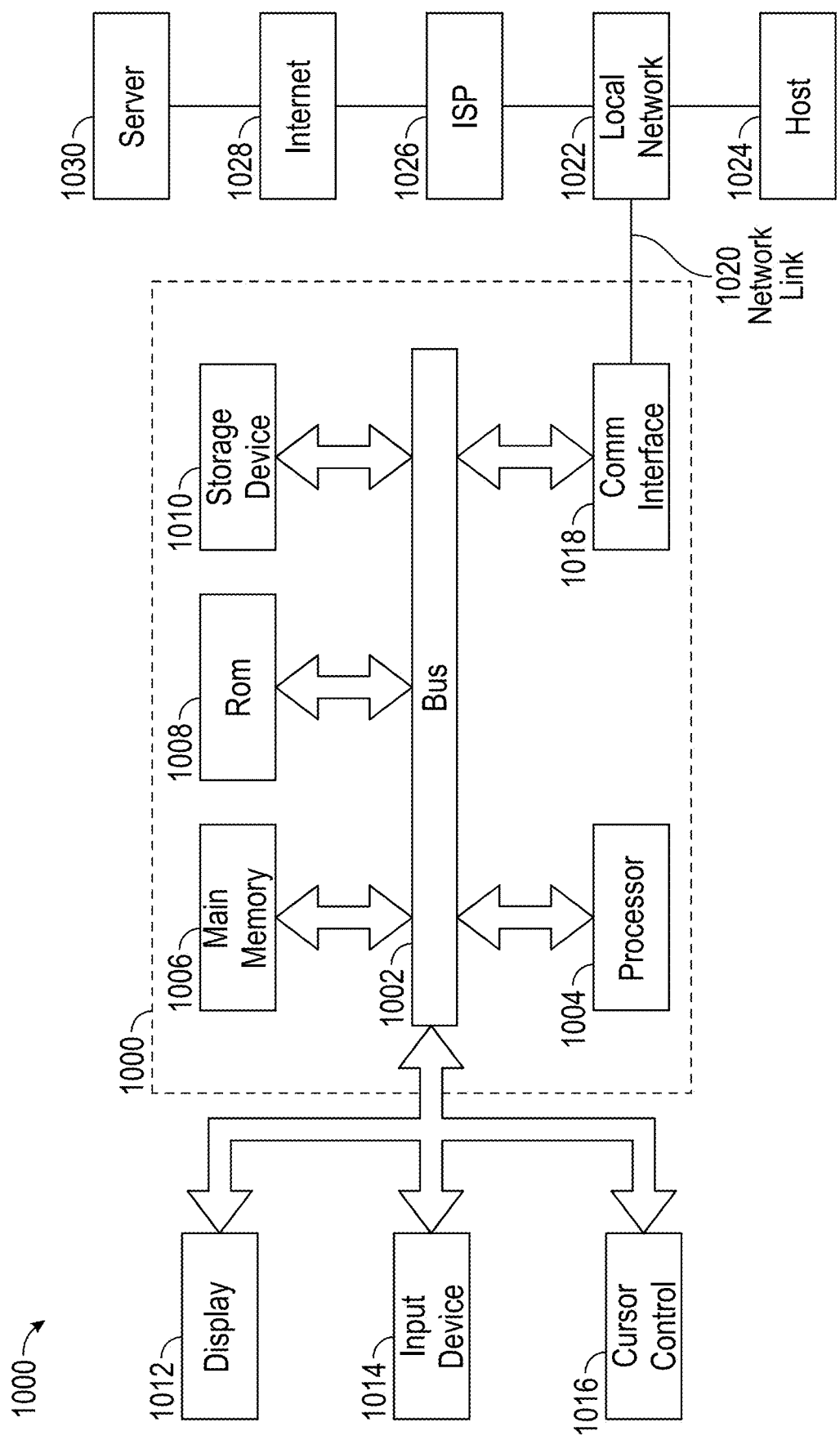
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

Examples

It will be appreciated that the present disclosure may include any one and up to all of the following examples.

Example 1: A method comprising: receiving first and second images, the first and second images containing a first category of differences, related to a software code underlying the first and second images, and a second category of differences, not related to the software code underlying the first and second images; generating first and second context images, each comprising an element layout of the first image and second images, respectively, wherein each context image comprises element areas and transparent areas; generating an inverted first context image by converting the element areas of the first context image into white pixels and converting the transparent areas of the first context image into black pixels; generating a combined context image by combining the inverted first context image with the second context image; generating an inverted combined context image; generating a preliminary difference image from the first and second images, the preliminary difference image, comprising an identification of difference pixels between the first and second images; generating a first intermediary difference image by merging the inverted combined context image and the preliminary difference image; inverting the preliminary difference image; generating a second intermediary difference image by adding the inverted preliminary difference image to the combined context image; generating a combined difference image by adding the first and second intermediary difference images; and generating and displaying an output difference image, based at least in part on the combined difference image, wherein the output difference image highlights the first and second categories of the differences in different colors.

Example 2: The method of Example 1, wherein generating the combined context image by combining the inverted first context image with the second context image, comprises: generating a white pixel in the combined context image, wherever a black pixel is combined with any pixel; and copying a pixel value to the combined context image, wherever a white pixel is combined with the pixel.

Example 3: The method of some or all of Examples 1 and 2, wherein the combined context image comprises common areas, and transparent areas, wherein generating the inverted combined context image comprises converting the common areas to black pixels, and leaving transparent areas unchanged, wherein the generating the first intermediary difference image by merging the inverted combined context image with the preliminary difference image comprises: generating a white pixel in the first intermediary difference image, wherever a black pixel is combined with any pixel; and copying a pixel value to the first intermediary difference image, wherever a white pixel is merged with the pixel.

Example 4: The method of some or all of Examples 1-3, further comprising retaining in the first intermediary difference image, difference areas exceeding in size above a selected threshold.

Example 5: The method of some or all of Examples 1-4, wherein inverting the preliminary difference image comprises converting the difference pixels to white pixels and converting the remaining pixels to black pixels, wherein generating the second intermediary difference image by adding the inverted preliminary difference image to the combined context image comprises: generating a white pixel in the second intermediary difference image, wherever a black pixel is added to any pixel; and copying a pixel value to the second intermediary difference image, wherever a white pixel is added to the pixel.

Example 6: The method of some or all of Examples 1-5, wherein the first and second images are screenshots of different versions of a webpage, wherein generating the context images are based at least in part on the dynamic object model (DOM) metadata of the webpage.

Example 7: The method of some or all of Examples 1-6 further comprising generating a map of each difference pixel and a corresponding DOM element.

Example 8: A non-transitory computer storage medium that stores executable program instructions that, when executed by one or more computing devices, configure the one or more computing devices to perform operations comprising: receiving first and second images, the first and second images containing a first category of differences, related to a software code underlying the first and second images, and a second category of differences, not related to the software code underlying the first and second images; generating first and second context images, each comprising an element layout of the first image and second images, respectively, wherein each context image comprises element areas and transparent areas; generating an inverted first context image by converting the element areas of the first context image into white pixels and converting the transparent areas of the first context image into black pixels; generating a combined context image by combining the inverted first context image with the second context image; generating an inverted combined context image; generating a preliminary difference image from the first and second images, the preliminary difference image, comprising an identification of difference pixels between the first and second images; generating a first intermediary difference image by merging the inverted combined context image and the preliminary difference image; inverting the preliminary difference image; generating a second intermediary difference image by adding the inverted preliminary difference image to the combined context image; generating a combined difference image by adding the first and second intermediary difference images; and generating and displaying an output difference image, based at least in part on the combined difference image, wherein the output difference image highlights the first and second categories of the differences in different colors.

Example 9: The non-transitory computer storage of Example 8, wherein generating the combined context image by combining the inverted first context image with the second context image, comprises: generating a white pixel in the combined context image, wherever a black pixel is combined with any pixel; and copying a pixel value to the combined context image, wherever a white pixel is combined with the pixel.

Example 10: The non-transitory computer storage of some or all of Examples 8 and 9, wherein the combined context image comprises common areas, and transparent areas, wherein generating the inverted combined context image comprises converting the common areas to black pixels, and leaving transparent areas unchanged, wherein the generating the first intermediary difference image by merging the inverted combined context image with the preliminary difference image comprises: generating a white pixel in the first intermediary difference image, wherever a black pixel is combined with any pixel; and copying a pixel value to the first intermediary difference image, wherever a white pixel is merged with the pixel.

Example 11: The non-transitory computer storage of some or all of Examples 8-10, wherein the operations further comprise retaining in the first intermediary difference image, difference areas exceeding in size above a selected threshold.

Example 12: The non-transitory computer storage of some or all of Examples 8-11, wherein inverting the preliminary difference image comprises converting the difference pixels to white pixels and converting the remaining pixels to black pixels, wherein generating the second intermediary difference image by adding the inverted preliminary difference image to the combined context image comprises: generating a white pixel in the second intermediary difference image, wherever a black pixel is added to any pixel; and copying a pixel value to the second intermediary difference image, wherever a white pixel is added to the pixel.

Example 13: The non-transitory computer storage of some or all of Examples 8-12, wherein the first and second images are screenshots of different versions of a webpage, wherein generating the context images are based at least in part on the dynamic object model (DOM) metadata of the webpage.

Example 14: The non-transitory computer storage of some or all of Examples 8-13, wherein the operations further comprise generating a map of each difference pixel and a corresponding DOM element.

Example 15: A system comprising one or more processors, wherein the one or more processors are configured to perform operations comprising: receiving first and second images, the first and second images containing a first category of differences, related to a software code underlying the first and second images, and a second category of differences, not related to the software code underlying the first and second images; generating first and second context images, each comprising an element layout of the first image and second images, respectively, wherein each context image comprises element areas and transparent areas; generating an inverted first context image by converting the element areas of the first context image into white pixels and converting the transparent areas of the first context image into black pixels; generating a combined context image by combining the inverted first context image with the second context image; generating an inverted combined context image; generating a preliminary difference image from the first and second images, the preliminary difference image, comprising an identification of difference pixels between the first and second images; generating a first intermediary difference image by merging the inverted combined context image and the preliminary difference image; inverting the preliminary difference image; generating a second intermediary difference image by adding the inverted preliminary difference image to the combined context image; generating a combined difference image by adding the first and second intermediary difference images; and generating and displaying an output difference image, based at least in part on the combined difference image, wherein the output difference image highlights the first and second categories of the differences in different colors.

Example 16: The system of Example 15, wherein generating the combined context image by combining the inverted first context image with the second context image, comprises: generating a white pixel in the combined context image, wherever a black pixel is combined with any pixel; and copying a pixel value to the combined context image, wherever a white pixel is combined with the pixel.

Example 17: The system of some or all of Examples 15 and 16, wherein the combined context image comprises common areas, and transparent areas, wherein generating the inverted combined context image comprises converting the common areas to black pixels, and leaving transparent areas unchanged, wherein the generating the first intermediary difference image by merging the inverted combined context image with the preliminary difference image comprises: generating a white pixel in the first intermediary difference image, wherever a black pixel is combined with any pixel; and copying a pixel value to the first intermediary difference image, wherever a white pixel is merged with the pixel.

Example 18: The system of some or all of Examples 15-17, wherein the operations further comprise retaining in the first intermediary difference image, difference areas exceeding in size above a selected threshold.

Example 19: The system of some or all of Examples 15-18, wherein inverting the preliminary difference image comprises converting the difference pixels to white pixels and converting the remaining pixels to black pixels, wherein generating the second intermediary difference image by adding the inverted preliminary difference image to the combined context image comprises: generating a white pixel in the second intermediary difference image, wherever a black pixel is added to any pixel; and copying a pixel value to the second intermediary difference image, wherever a white pixel is added to the pixel.

Example 20: The system of some or all of Examples 15-19, wherein the first and second images are screenshots of different versions of a webpage, wherein generating the context images are based at least in part on the dynamic object model (DOM) metadata of the webpage.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
    receiving first and second images, the first and second images containing a first category of differences, related to a software code underlying the first and second images, and a second category of differences, not related to the software code underlying the first and second images;
    generating first and second context images, each comprising an element layout of the first image and second images, respectively, wherein each context image comprises element areas and transparent areas;
    generating an inverted first context image by converting the element areas of the first context image into white pixels and converting the transparent areas of the first context image into black pixels;
    generating a combined context image by combining the inverted first context image with the second context image;
    generating an inverted combined context image;
    generating a preliminary difference image from the first and second images, the preliminary difference image, comprising an identification of difference pixels between the first and second images;
    generating a first intermediary difference image by merging the inverted combined context image and the preliminary difference image;
    inverting the preliminary difference image;
    generating a second intermediary difference image by adding the inverted preliminary difference image to the combined context image;
    generating a combined difference image by adding the first and second intermediary difference images; and
    generating and displaying an output difference image, based at least in part on the combined difference image, wherein the output difference image highlights the first and second categories of the differences in different colors.

2. The method of claim 1, wherein generating the combined context image by combining the inverted first context image with the second context image, comprises:
    generating a white pixel in the combined context image, wherever a black pixel is combined with any pixel; and
    copying a pixel value to the combined context image, wherever a white pixel is combined with the pixel.

3. The method of claim 1,
    wherein the combined context image comprises common areas, and transparent areas,
    wherein generating the inverted combined context image comprises converting the common areas to black pixels, and leaving transparent areas unchanged,
    wherein the generating the first intermediary difference image by merging the inverted combined context image with the preliminary difference image comprises:

generating a white pixel in the first intermediary difference image, wherever a black pixel is combined with any pixel; and copying a pixel value to the first intermediary difference image, wherever a white pixel is merged with the pixel.

4. The method of claim 1, further comprising retaining in the first intermediary difference image, difference areas exceeding in size above a selected threshold.

5. The method of claim 1,
wherein inverting the preliminary difference image comprises converting the difference pixels to white pixels and converting the remaining pixels to black pixels,
wherein generating the second intermediary difference image by adding the inverted preliminary difference image to the combined context image comprises:
generating a white pixel in the second intermediary difference image, wherever a black pixel is added to any pixel; and
copying a pixel value to the second intermediary difference image, wherever a white pixel is added to the pixel.

6. The method of claim 1, wherein the first and second images are screenshots of different versions of a webpage, wherein generating the context images are based at least in part on the dynamic object model (DOM) metadata of the webpage.

7. The method of claim 6 further comprising generating a map of each difference pixel and a corresponding DOM element.

8. A non-transitory computer storage medium that stores executable program instructions that, when executed by one or more computing devices, configure the one or more computing devices to perform operations comprising:
receiving first and second images, the first and second images containing a first category of differences, related to a software code underlying the first and second images, and a second category of differences, not related to the software code underlying the first and second images;
generating first and second context images, each comprising an element layout of the first image and second images, respectively, wherein each context image comprises element areas and transparent areas;
generating an inverted first context image by converting the element areas of the first context image into white pixels and converting the transparent areas of the first context image into black pixels;
generating a combined context image by combining the inverted first context image with the second context image;
generating an inverted combined context image;
generating a preliminary difference image from the first and second images, the preliminary difference image, comprising an identification of difference pixels between the first and second images;
generating a first intermediary difference image by merging the inverted combined context image and the preliminary difference image;
inverting the preliminary difference image;
generating a second intermediary difference image by adding the inverted preliminary difference image to the combined context image;
generating a combined difference image by adding the first and second intermediary difference images; and
generating and displaying an output difference image, based at least in part on the combined difference image,
wherein the output difference image highlights the first and second categories of the differences in different colors.

9. The non-transitory computer storage of claim 8, wherein generating the combined context image by combining the inverted first context image with the second context image, comprises:
generating a white pixel in the combined context image, wherever a black pixel is combined with any pixel; and
copying a pixel value to the combined context image, wherever a white pixel is combined with the pixel.

10. The non-transitory computer storage of claim 8,
wherein the combined context image comprises common areas, and transparent areas,
wherein generating the inverted combined context image comprises converting the common areas to black pixels, and leaving transparent areas unchanged,
wherein the generating the first intermediary difference image by merging the inverted combined context image with the preliminary difference image comprises:
generating a white pixel in the first intermediary difference image, wherever a black pixel is combined with any pixel; and
copying a pixel value to the first intermediary difference image, wherever a white pixel is merged with the pixel.

11. The non-transitory computer storage of claim 8, wherein the operations further comprise retaining in the first intermediary difference image, difference areas exceeding in size above a selected threshold.

12. The non-transitory computer storage of claim 8,
wherein inverting the preliminary difference image comprises converting the difference pixels to white pixels and converting the remaining pixels to black pixels,
wherein generating the second intermediary difference image by adding the inverted preliminary difference image to the combined context image comprises:
generating a white pixel in the second intermediary difference image, wherever a black pixel is added to any pixel; and
copying a pixel value to the second intermediary difference image, wherever a white pixel is added to the pixel.

13. The non-transitory computer storage of claim 8, wherein the first and second images are screenshots of different versions of a webpage, wherein generating the context images are based at least in part on the dynamic object model (DOM) metadata of the webpage.

14. The non-transitory computer storage of claim 13, wherein the operations further comprise generating a map of each difference pixel and a corresponding DOM element.

15. A system comprising one or more processors, wherein the one or more processors are configured to perform operations comprising:
receiving first and second images, the first and second images containing a first category of differences, related to a software code underlying the first and second images, and a second category of differences, not related to the software code underlying the first and second images;
generating first and second context images, each comprising an element layout of the first image and second images, respectively, wherein each context image comprises element areas and transparent areas;
generating an inverted first context image by converting the element areas of the first context image into white pixels and converting the transparent areas of the first context image into black pixels;

generating a combined context image by combining the inverted first context image with the second context image;

generating an inverted combined context image;

generating a preliminary difference image from the first and second images, the preliminary difference image, comprising an identification of difference pixels between the first and second images;

generating a first intermediary difference image by merging the inverted combined context image and the preliminary difference image;

inverting the preliminary difference image;

generating a second intermediary difference image by adding the inverted preliminary difference image to the combined context image;

generating a combined difference image by adding the first and second intermediary difference images; and generating and displaying an output difference image, based at least in part on the combined difference image, wherein the output difference image highlights the first and second categories of the differences in different colors.

16. The system of claim 15, wherein generating the combined context image by combining the inverted first context image with the second context image, comprises:

generating a white pixel in the combined context image, wherever a black pixel is combined with any pixel; and copying a pixel value to the combined context image, wherever a white pixel is combined with the pixel.

17. The system of claim 15, wherein the combined context image comprises common areas, and transparent areas, wherein generating the inverted combined context image comprises converting the common areas to black pixels, and leaving transparent areas unchanged, wherein the generating the first intermediary difference image by merging the inverted combined context image with the preliminary difference image comprises:

generating a white pixel in the first intermediary difference image, wherever a black pixel is combined with any pixel; and copying a pixel value to the first intermediary difference image, wherever a white pixel is merged with the pixel.

18. The system of claim 15, wherein the operations further comprise retaining in the first intermediary difference image, difference areas exceeding in size above a selected threshold.

19. The system of claim 15, wherein inverting the preliminary difference image comprises converting the difference pixels to white pixels and converting the remaining pixels to black pixels, wherein generating the second intermediary difference image by adding the inverted preliminary difference image to the combined context image comprises:

generating a white pixel in the second intermediary difference image, wherever a black pixel is added to any pixel; and copying a pixel value to the second intermediary difference image, wherever a white pixel is added to the pixel.

20. The system of claim 15, wherein the first and second images are screenshots of different versions of a webpage, wherein generating the context images are based at least in part on the dynamic object model (DOM) metadata of the webpage.

* * * * *